United States Patent [19]

Rew

[11] Patent Number: 5,033,085

[45] Date of Patent: Jul. 16, 1991

[54] METHOD FOR CONTROLLING VIDEO AND AUDIO OF A TELEVISION SET

[75] Inventor: Sang W. Rew, Seoul, Rep. of Korea

[73] Assignee: Goldstar Co., Ltd., Seoul, Rep. of Korea

[21] Appl. No.: 211,898

[22] Filed: Jun. 27, 1988

[30] Foreign Application Priority Data

Jun. 30, 1987 [KR] Rep. of Korea ............... 6719/1987
Jul. 15, 1987 [KR] Rep. of Korea ............... 7657/1987

[51] Int. Cl.⁵ .................... H04N 7/167; H04N 7/10; G09G 3/02; G08B 5/36
[52] U.S. Cl. ........................... 380/20; 358/86; 358/349; 340/703; 340/706; 340/815.1; 340/815.05
[58] Field of Search ............... 380/7, 10, 20; 358/349, 358/86; 455/4, 6; 340/815.1, 815.01, 815.04, 815.05, 701, 703, 736

[56] References Cited

U.S. PATENT DOCUMENTS

| | | | |
|---|---|---|---|
| 4,620,229 | 10/1986 | Amano et al. | 380/10 |
| 4,685,131 | 8/1987 | Horne | 380/20 |
| 4,718,107 | 1/1988 | Hayes | 358/86 X |

Primary Examiner—Linda J. Wallace

[57] ABSTRACT

A method for controlling video and audio of a television set using a code in such a manner that a code is set up in a microcomputer of the television set, which is operated normally only when the code is released by input of a key signal corresponding to the code, to output the video and audio signals. Therefore, it is possible to prevent any person who does not know the code from driving the television set. For example, it is possible to prevent children from watching the television broadcast stealthily without notice of adults.

7 Claims, 6 Drawing Sheets

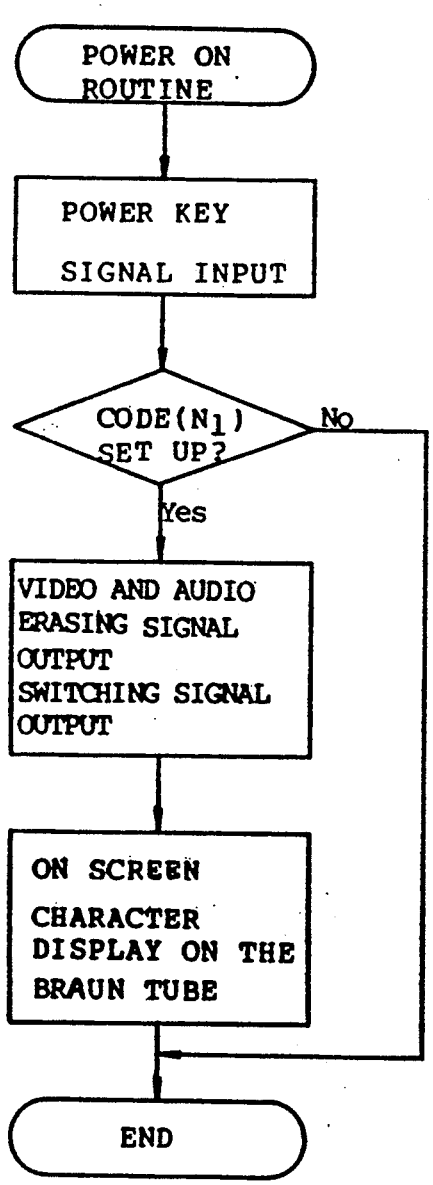
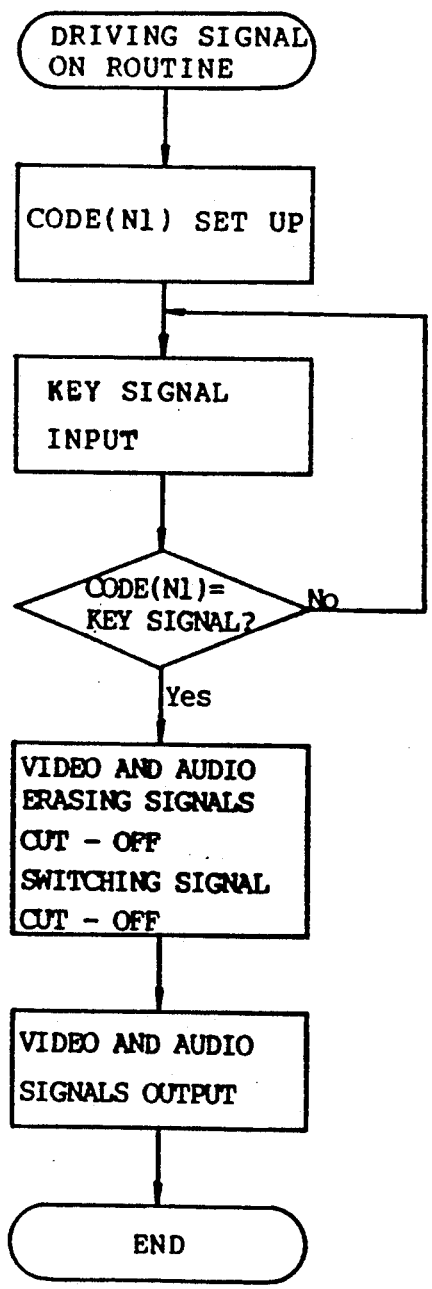

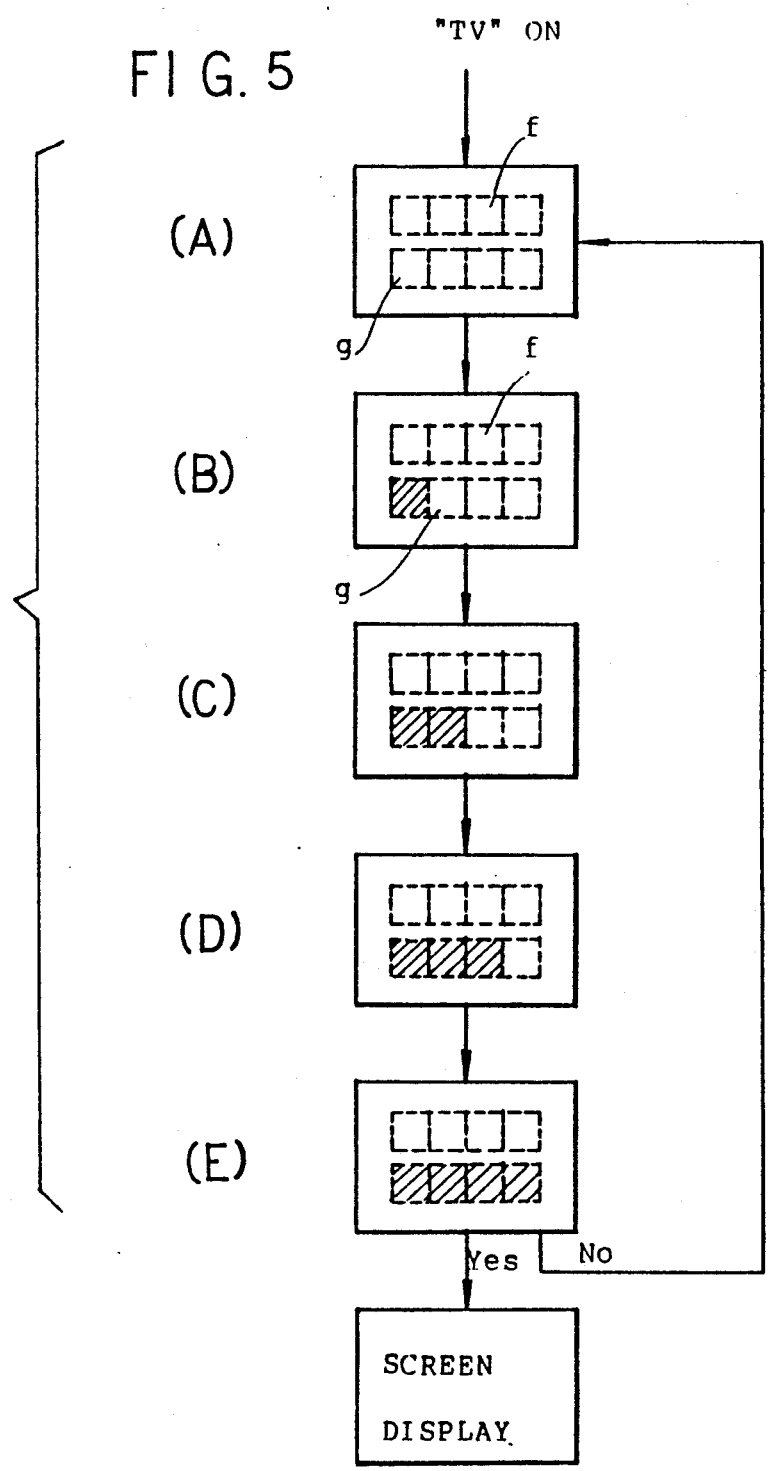

METHOD FOR CONTROLLING VIDEO AND AUDIO OF A TELEVISION SET

BACKGROUND OF THE INVENTION

The present invention relates to a method for controlling the driving of a television set, and more particularly to a method for controlling video and audio signals of a television set by making use of a code, in which a code (secret number) is set up in a micom (microcomputer) of a television set, and the television set is designed to operate normally only when a key signal corresponding to the code is input and releases the to thereby output video and audio signals. In general, when a power key is pressed, an operating power source is immediately applied to a driving element so that a television set is driven. Therefore, in such a conventional television set, it is possible for any person other than the user to watch the television by simply pressing the power key of the television set as desired. Particularly, a disadvantage of a conventional television set is that children may press the power key of the television set stealthily without supervision of adults, and watch adult television programs as they choose, which can have a harmful effect on the education of children.

SUMMARY OF THE INVENTION

It is the object of the present invention to provide a television set in which a code is to be set up and which is driven to be watched normally only by a person who knows the code.

According to the present invention, this object is achieved in that in a state that no code is set up in the television set, the television set is driven normally by pressing the power key only as in the conventional way. In a state that a code is set up in the television set, the television set is not driven normally when the power key is pressed. When the power key is pressed there is displayed a code set-up state, and then as a key signal corresponding to the code is input, the code set-up state display is released and at the same time, the video and audio signals of the television broadcast are output normally.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein:

FIG. 5 is an illustrative view showing the display process of the ON screen character display signals.

DETAILED DESCRIPTION OF THE INVENTION

Figure 1:
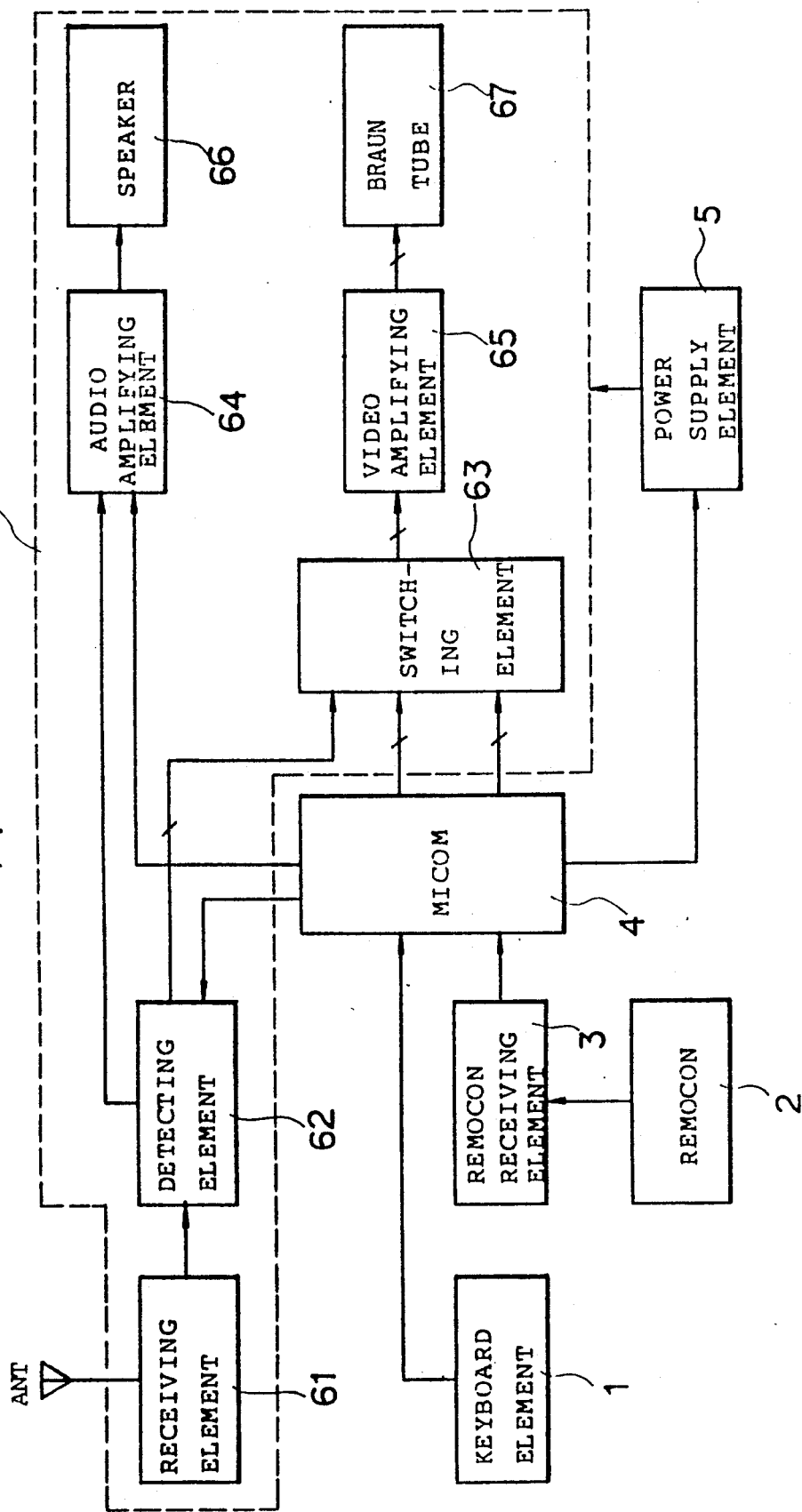
FIG. 1 is a block diagram of a television set as applied to a method for controlling the video and audio output according to the present invention.

As shown in FIG. 1, a first embodiment of the present invention comprises a keyboard element 1 for outputting a key signal, a remocon (remote control) 2 for outputting a remote control key signal, a remote control receiving element 3 for receiving the remote control signal of said remote control 2, a microcomputer 4 for controlling the driving of a television set according to the key signals of said keyboard 1 or remote control receiving element 3, a power supply element 5 for applying the driving power source to a driving element of the television set by the control signal of said microcomputer 4, and a driving element 6 which is supplied the driving power from said power supply element 5 and is subject to the control of said microcomputer 4. Further, the driving element 6 comprises a receiving element 61 for receiving the television broadcasting signals input through an antenna ANT, a detecting element 62 for selecting the television broadcasting signals received by said receiving element 61 according to a control signal from said microcomputer 4, a switching element 63 for selecting the video signals output from said detecting element 62 or an ON screen character display signal output from said microcomputer 4 under control of the microcomputer 4, an audio amplifying element 64 for amplifying the audio signals output from said detecting element 62 under control of said microcomputer 4, a video amplifying element 65 for amplifying the video signals or the ON screen character display signals output from said switching element 63, a speaker 66 for outputting the audio signals output from the audio amplifying element 64, and a Braun tube 67 for displaying the video signals or the ON screen character display signals output from the video amplifying element 65.

Figure 2:
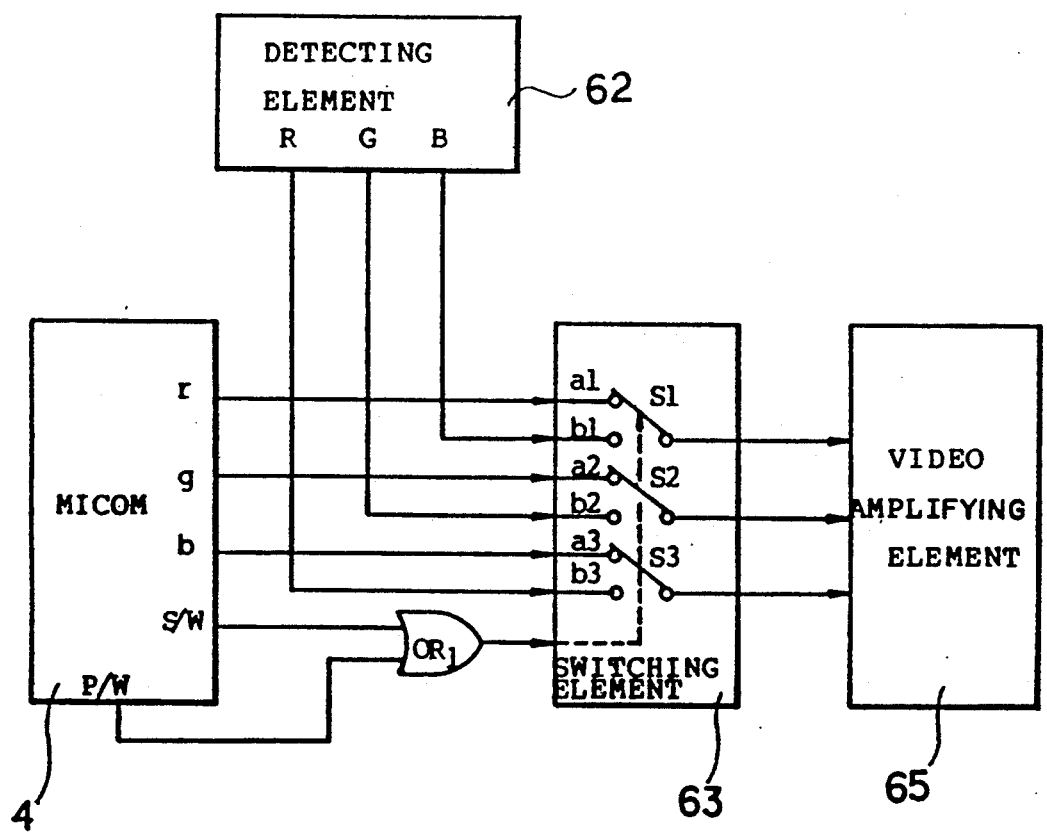
FIG. 2 is an illustrative view showing the construction of the switching element of FIG. 1.

FIG. 2 is a view illustrating the construction of the switching element 63 of FIG. 1, in which the switching element 63 comprises switches S1- S3. The ON screen character display signals output from the output terminals r,g,b of the microcomputer 4 or the video signals output from the output terminals R,G,B of the detecting element 62 are designed to be input to the video amplifying element 65 through switches S1 - S3 of the switching element 63. That is, in a state that high potential switching signals are output to the switching signal output terminal S/W of the microcomputer 4 or high potential video erasing signals are output to the video erasing signal output terminal P/W so that high potential signals are output from the OR gate OR1, the switches S1 - S3 of the switching element 63 are short-circuited to terminals a1 - a3 on one side, and consequently the ON screen character display signals of output terminals r,g,b of the microcomputer 4 are input to the video amplifying element 65 through the switches S1 - S3. While in a state that no switching signal is output to the switching signal output terminal S/W of the microcomputer 4 and no video erasing signal is output to the video erasing signal output terminal P/W so that low potential signals are output from the OR gate OR1, the switches S1 - S3 of the switching element 63 are short-circuited to terminals b1 - b3 on the other side, and consequently the video signals of output terminals R,G,B of the detecting element 62 are input to the video amplifying element 65 through the switches S1 - S3.

A method for controlling the video and audio signal output according to an embodiment of the present invention will now be described with reference to the flow diagrams of FIGS. 3 and 4.

First, as the power key of the keyboard element 1 or remote control 2 is pressed and the power key signal is input to the microcomputer 4, the microcomputer 4 controls the power supply element 5 so that the driving power is applied to the driving element. The microcomputer 4 determines at the same time whether or not a code N1 is set up as in the flow diagram of FIG. 3 (A) and if no code N1 is set up, the microcomputer 4 directs normal operation of the system as in a conventional television set. In other words, the microcomputer 4 controls the detecting element 62 by the remote control key signal of the keyboard element 1 or remote control 2 to select the television broadcasting signals, and the video signals of the selected broadcasting signals are displayed on the Braun tube 67 through the switching element 63 and the video amplifying element 65, and the audio signals are output to the speaker 66 through the audio amplifying element 64.

Meanwhile, if a code N1 is set up in a case as described above, the microcomputer 4 outputs an audio erasing signal so that no audio signal is output from the audio amplifying element 64, and also outputs the video erasing and switching signals so that the switches S1 - S3 of the switching element 63 are short circuited to terminals a1 - a3 on one side and at the same time the ON screen character display signals are output. Accordingly, the video signals output from the detecting element 62 do not pass the switching element 63, and the ON screen character display signals output from the microcomputer 4 are displayed on the Braun tube 67 through the switching element 63 and the video amplifying element 65. Consequently, the user may perceive that the code is set up. As the user operates the keyboard element 1 or remote control 2 and a code key signal is thereby input to the microcomputer 4, the output of the said video and audio erasing signals is cut off when such code key signal corresponds with the code (N1) signal, and concurrently the output of the switching signal is cut off as shown in FIG. 3 (B). Accordingly, as described previously, the television broadcasting signals are selected in the detecting element 62 by the control of the microcomputer 4, and the selected video and audio signals are output to the Braun tube 67 and the speaker 66.

Figure 3:
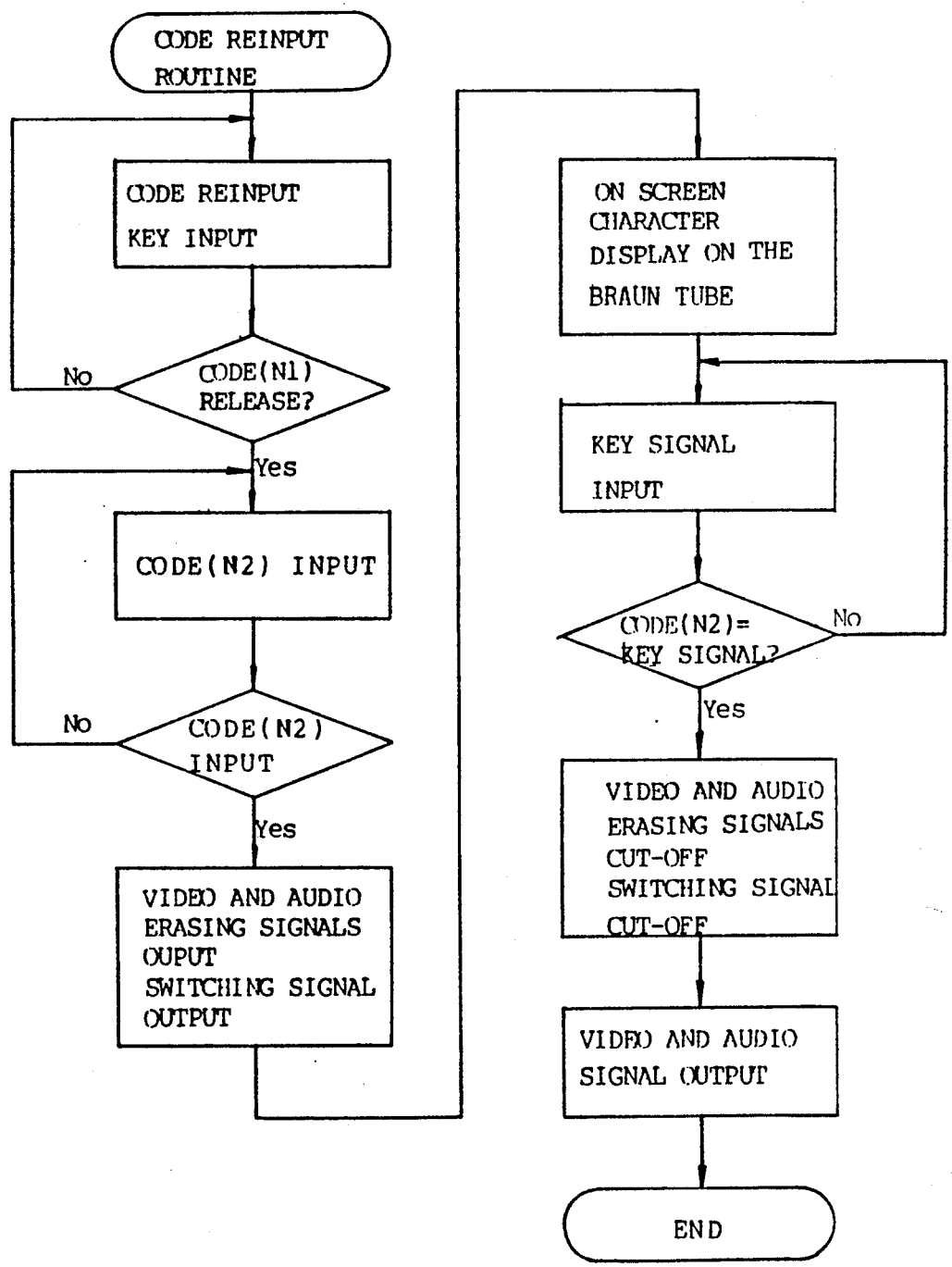
FIGS. 3 (A) to (C) are flow diagrams for controlling the micom by a method for controlling the video and audio output according to the present invention.
Figure 4:
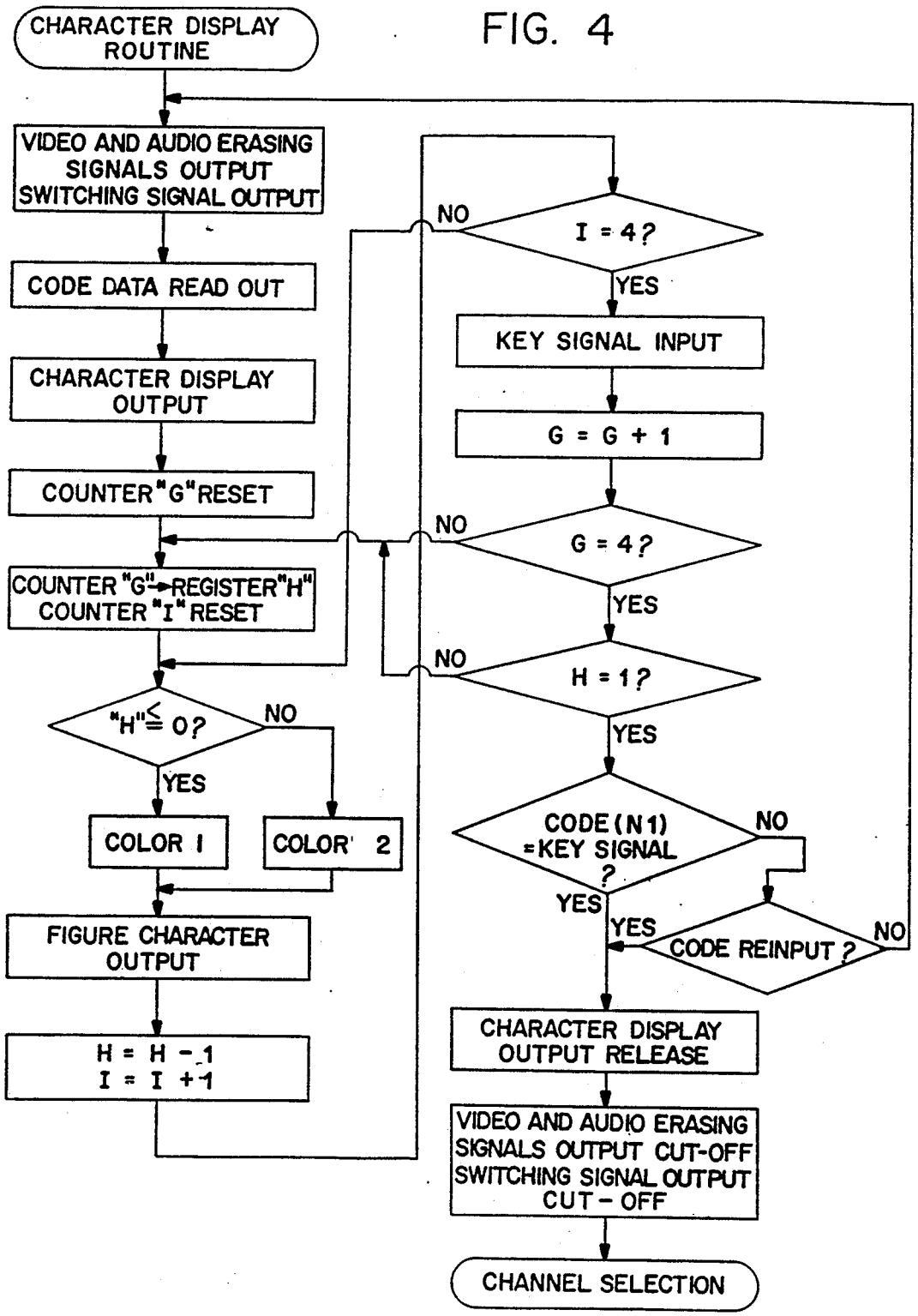
FIG. 4 is a flow diagram for controlling the character display of the micom in FIG. 3.

Meanwhile, after releasing the already set code N1 by pressing the code reinput key of the keyboard 1 or the remote control 2, it is possible to set up a new code as shown in the flow diagram of FIG. 3 (C). That is, when a code reinput key signal is input to the microcomputer 4, the already set code N1 is released, and thereafter when all the code (N2) key signals are input, the code N2 is set up as a new code.

Consequently, as described above, the video and audio erasing signals are, thereafter, output and at the same time the switching signals are output, and then the ON screen character display signals are output to be displayed on the Braun tube 67.

Under this state, in the event that a code key signal is input to the microcomputer 4 as described previously, the input code key signal cuts off the output of the video and audio erasing signal when it corresponds to the already set code N2, and it intercepts concurrently the switching signals so that the television set is operated normally in the same manner of a conventional television.

The process to display said ON screen character display signal will now be described with reference to the flow diagram of FIG. 4. First, in a state that a code N1 is set up, the high potential video erasing signals are output to the video erasing signal output terminal P/W, and after decoding the data of the code N1, the character display signals for informing the user that the code is set up, are output to the output terminals r, g, b. Thus output character display signals are applied to the Braun tube 65 through the switching element 63 and the video amplifying element 65 and they are displayed as in the part f shown on the upper edges of FIG. 5, so that it is perceivable that the code N1 is set up.

Thereafter, the key input number counter G is reset, the value of the counter G is stored in the register H, and the frequency counter I is reset. In the event that the value stored in the register H is under "0", the figure character signals of color 1 are output and displayed as in the part g shown on the lower edges of FIG. 5 (A). Subsequently the process following the step for determining if the value of the register H is under "0" is carried out repeatedly until the value of the frequency counter I reaches "4", after subtracting "1" from the value stored in the register H and adding "1" to the frequency counter I. When the frequency counter I reaches "4" in this manner, the key signal is input, and the process following the step storing the value of the key input number counter G in the register H is carried out repeatedly until the value of the counter G reaches "4" after adding "1" to the key input number counter G. In the above-mentioned case, if the value of the register H is not under "0", that is, it is over "1", the figure character signals of color 2 are output and displayed as in the part g shown on the lower edges of FIG. 5 (B) (obliquely lined part).

As such process is carried out repeatedly until the value of the key input number counter G reaches "4", the figure character display of color 1 is decreased one by one in regular sequence as shown in FIG. 5 (A) to (E), and the figure character display of color 2 is increased one by one in regular sequence so that the user may perceive the responding state of the key signal. Here, the values of the counters G, I are increased up to "4", for the case where the code is set up by a number of four ciphers, is described as an example.

As the value of the key input number counter G reaches "4" with the key signal put in four times as described above, it is determined whether or not the input key signal of four ciphers corresponds to the already set code N1. In the case where the former corresponds to the later, the output of the ON screen character display signals is released as described previously, and at the same time the output of the video and audio erasing signals is intercepted and the output of the switching signals is intercepted so that the television set is operated normally in the manner of a conventional television. In the case where the key signal does not correspond to the already set code N1, it is again determined if it is a reinput of code, and if so, the television set is operated normally as described above, and if not, the process following the step for putting out the video and audio erasing signals is carried out repeatedly.

As described above in detail, the present invention has the effect that when an optional code being is set up in the television set, the television set is driven normally only in a state that the code is released by input of a key signal corresponding to the code, and it is possible to see and listen the television broadcast. Consequently, any person who does not know the code, is unable to drive the television set and it is therefore possible to prevent children from watching television broadcast stealthily without supervision of adults. Furthermore the responding state of the key signal input is indicated at the time of input of the key signal which allows the users more convenience.

What is claimed is:

1. A method of preventing unauthorized use of a television set through the use of an authorization code comprising the steps of:
   applying a driving power to a driving element of the television set;
   determining if an authorization code is programmed into a memory unit of the television set;
   driving the driving element with video and audio signals for normal television broadcast if an authorization code is not programmed into the memory unit; and
   outputting video and audio erasing signals and switching signals for a control element of the television set, if an authorization code is programmed into the memory unit, to prevent the video and audio signals from driving the driving element for normal television broadcast and displaying an on-screen character display signal indicative of an operation block of the television set until it is determined that an access code entered into the control element by a user via a data input means matches the authorization code to thereby prevent unauthorized use of the television set,
   said on-screen character display comprises displaying square images, equal in number to the digits of said authorization code, of a first color, said square images changing sequentially in order to a second color as the digits of said access code are entered into the control unit by the user.

2. The method of preventing unauthorized use of a television set according to claim 1 comprising the further step of driving the driving element with video and audio signals for normal television broadcast once it is determined that said access code and said authorization code match.

3. The method of preventing unauthorized use of a television set according to claim 1 wherein the entry of a code reinput signal into the control element when the on-screen character display signal is displayed erases the programmed authorization code whereby a new authorization code may be programmed into the memory unit by the user.

4. A television set comprising:
   receiving means, for receiving television broadcast signals;
   detecting means, coupled to said receiving means, for selecting said television broadcast signals received by said receiving means, in accordance with a selection control signal, to output selected television broadcast signals;
   control means, coupled to said detecting means, for outputting said selection control signal and for controlling the television set;
   data input means, coupled to said control means, for entering user data pertaining to operation of the television set;
   switching means, coupled to said detecting means and said control means, for receiving therefrom said selected television broadcast signals and on-screen character display signals, respectively, and for selectively outputting one of said selected television broadcast signals or said on-screen character display signals in accordance with a switching signal, of a first and second state, from said control means; and
   display means, coupled to said switching means, for displaying a selected television broadcast or an on-screen character display in accordance with the output of said switching means,
   said control means operative to determine if an authorization code has been programmed into a memory means by a user via said data input means to
   output said switching signal of the first state if said authorization code is not programmed into said memory unit to direct output of said selected television broadcast signals from said switching means, and
   output said switching signal of the second stat if said authorization code is programmed into said memory unit to direct output of said on-screen character display signals from said switching means until it is determined by said control means that an access code entered by the user matches said authorization code to thereby prevent unauthorized use of the television set,
   said on-screen character display comprises square images, equal in number to the digits of said authorization code, which are of a first color, said square images changing sequentially in order to a second color as the digits of said access code are entered into the control means by the user.

5. The television set according to claim 4 wherein said control means is further operative to output said switching signal of the first state once said control means determines that said access code matches said authorization code.

6. The television set according to claim 4 wherein said data input means comprises:
   keyboard means, coupled to said control means, for entering user data to said control means;
   remote control transmitter means for transmitting remote control user data to the television set; and
   remote control receiver means, coupled to said control means, for receiving and outputting said remote control user data to said control means.

7. The television set according to claim 4 wherein said on-screen character display comprises an operation block of said television set.

* * * * *